(12) United States Patent
Qin et al.

(10) Patent No.: US 10,795,075 B2
(45) Date of Patent: Oct. 6, 2020

(54) BACKLIGHT MODULE AND DISPLAY DEVICE

(71) Applicant: SHANGHAI TIANMA MICRO-ELECTRONICS CO., LTD., Shanghai (CN)

(72) Inventors: Feng Qin, Shanghai (CN); Wanchun Du, Shanghai (CN); Lu Yao, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 0 days.

(21) Appl. No.: 16/295,191

(22) Filed: Mar. 7, 2019

(65) Prior Publication Data

US 2020/0174178 A1 Jun. 4, 2020

(30) Foreign Application Priority Data

Nov. 30, 2018 (CN) .......................... 2018 1 1451029

(51) Int. Cl.
*F21V 8/00* (2006.01)
(52) U.S. Cl.
CPC ......... *G02B 6/0075* (2013.01); *G02B 6/0051* (2013.01); *G02B 6/0053* (2013.01); *G02B 6/0065* (2013.01); *G02B 6/0068* (2013.01); *G02B 6/0073* (2013.01);
(Continued)

(58) Field of Classification Search
CPC .. G02B 6/0031; G02B 6/0051; G02B 6/0053; G02B 6/0055; G02B 6/0065; G02B 6/0068; G02B 6/0073; G02B 6/0075; G02B 6/0076; G02B 6/0088; G02B 6/0091;
(Continued)

(56) References Cited

U.S. PATENT DOCUMENTS

| | | | |
|---|---|---|---|
| 2010/0002183 A1* | 1/2010 | Fukuda | G02F 1/1303 349/158 |
| 2012/0002441 A1* | 1/2012 | Yabe | G02B 6/002 362/607 |

(Continued)

FOREIGN PATENT DOCUMENTS

| | | |
|---|---|---|
| CN | 101153972 A | 4/2008 |
| CN | 102760837 A | 10/2012 |

(Continued)

*Primary Examiner* — Jessica M Merlin
(74) *Attorney, Agent, or Firm* — Anova Law Group PLLC

(57) ABSTRACT

Backlight module and display device are provided. The backlight module includes an accommodation frame including a base and an extending part, a first light guide plate, a second light guide plate; a first reflector, a first light source, and a second light source. The first light guide plate and the second light guide plate are disposed sequentially along a direction perpendicular to a plane of the base in an accommodation space formed by the base and the extending part, and are controlled independently. The first light source has a wavelength $\lambda 1$ of 780 nm<$\lambda 1 \leq 1310$ nm, and the second light source has a wavelength $\lambda 2$ of 380 nm$\leq \lambda 2 \leq 780$ nm. A reflectivity of the first reflector on light emitted by the second light source is larger than a reflectivity of the first reflector on light emitted by the first light source.

19 Claims, 8 Drawing Sheets

(52) U.S. Cl.
CPC ......... *G02B 6/0076* (2013.01); *G02B 6/0088* (2013.01); *G02B 6/0091* (2013.01)

(58) Field of Classification Search
CPC ............. G06F 3/0421; G02F 1/133605; G02F 1/133608; G02F 1/1347; G02F 2201/34
See application file for complete search history.

(56) References Cited

U.S. PATENT DOCUMENTS

| | | | | |
|---|---|---|---|---|
| 2012/0229422 A1* | 9/2012 | Hwang | ................ | G02B 6/0068 345/175 |
| 2012/0293715 A1* | 11/2012 | Kasai | ................... | G02B 6/0091 348/725 |
| 2014/0022156 A1* | 1/2014 | Han | ..................... | G09G 3/3648 345/102 |
| 2014/0240639 A1* | 8/2014 | Jung | ................ | G02F 1/133615 349/60 |
| 2016/0299369 A1* | 10/2016 | He | ..................... | G02F 1/13471 |

FOREIGN PATENT DOCUMENTS

| | | | |
|---|---|---|---|
| CN | 102769025 A | 11/2012 |
| CN | 103576380 A | 2/2014 |
| CN | 107302010 A | 10/2017 |

\* cited by examiner

BACKLIGHT MODULE AND DISPLAY DEVICE

CROSS-REFERENCES TO RELATED APPLICATION

This application claims the priority of Chinese Patent Application No. 201811451029.6, filed on Nov. 30, 2018, the content of which is incorporated herein by reference in its entirety.

TECHNICAL FIELD

The present disclosure generally relates to the field of display technology and, more particularly, relates to a backlight module and a display device.

BACKGROUND

A liquid crystal display device is an ultrathin planar display device and usually includes a plurality of color or black-and-white pixels placed in front of a light source or a reflective surface. A liquid crystal display device usually consumes a small amount of power and is widely used in electric devices using batteries. In a liquid crystal display device, electrical current is used to stimulate liquid crystal molecules to produce dots, lines, and planes for forming images together with backlights.

As a special matter between a solid and a liquid, a liquid crystal is an organic compound which is liquid in regular conditions. Molecules in a liquid crystal are arranged regularly as a solid crystal. If an external electric field is applied on a liquid crystal, an arrangement of the molecules in the liquid crystal will change and the liquid crystal will block light when a polarizer is disposed in the liquid crystal. However, the light beams can transmit through the liquid crystal without the external electric field. Correspondingly, if a color filter is further disposed with the liquid crystal, an amount of light with a specific color transmitting through the liquid crystal can be controlled by changing a voltage applied on the liquid crystal. Correspondingly, a transmittance of the liquid crystal can be controlled by changing a voltage applied on the liquid crystal.

With continuous development of liquid crystal display technologies, application fields of liquid crystal displays, especially of colorful liquid crystal displays, are also continuously expanding. Driven by a market of the liquid crystal display devices, a backlight industry also develops prosperously. The liquid crystal display is a non-luminescent display device and the backlight module is necessary for display. High-definition, large-size liquid crystal displays must be cooperated with high-performance backlight technology. When the liquid crystal display industry is striving to expand new applications, the backlight module technology with a high performance plays the role of a backstage hero.

The disclosed display module and display device are directed to solve one or more problems set forth above and other problems.

SUMMARY

One aspect of the present disclosure provides a backlight module. The backlight module includes accommodation frame including a base and an extending part surrounding the base; a first light guide plate, a second light guide plate, a first reflector between the first light guide plate and the second light guide plate, a first light source corresponding to the first light guide plate, and a second light source corresponding to the second light guide plate. The base and the extending part together form an accommodation space. The first light guide plate and the second light guide plate are disposed sequentially along a direction perpendicular to a plane of the base in the accommodation space. The first light source and the second light source are controlled independently. The first light source has a wavelength $\lambda 1$ of 780 nm$<\lambda 1 \leq$1310 nm, and the second light source has a wavelength $\lambda 2$ of 380 nm$\leq \lambda 2 \leq$780 nm. A reflectivity of the first reflector on a light emitted by the second light source is larger than a reflectivity of the first reflector on a light emitted by the first light source.

Another aspect of the present disclosure provides a display device. The display device includes a display panel and a backlight module. A side of the display panel away from a light exiting surface is attached to the backlight module by a light blocking tape. The display panel includes a display area and a non-display area. The light blocking tape is disposed in the non-display area. The backlight module includes an accommodation frame including a base and an extending part surrounding the base; a first light guide plate, a second light guide plate, a first reflector between the first light guide plate and the second light guide plate, a first light source corresponding to the first light guide plate, and a second light source corresponding to the second light guide plate. The base and the extending part together form an accommodation space. The first light guide plate and the second light guide plate are disposed sequentially along a direction perpendicular to a plane of the base in the accommodation space. The first light source and the second light source are controlled independently. The first light source has a wavelength $\lambda 1$ of 780 nm$<\lambda 1 \leq$1310 nm, and the second light source has a wavelength $\lambda 2$ of 380 nm$\leq \lambda 2 \leq$780 nm. A reflectivity of the first reflector on a light emitted by the second light source is larger than a reflectivity of the first reflector on a light emitted by the first light source.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
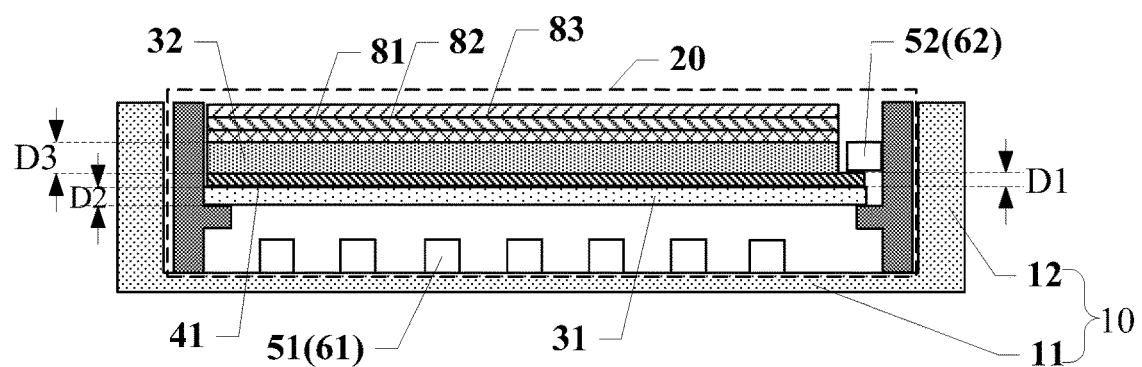
FIG. 1 illustrates a cross-section view of an exemplary backlight module consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width and depth should be considered during practical fabrication.

With continuous developments of liquid crystal display technologies, application fields of liquid crystal displays, especially of colorful liquid crystal displays, are also continuously expanding. Driven by a market of the liquid crystal display devices, a backlight industry also develops prosperously. The liquid crystal display is a non-luminescent display device and the backlight module is necessary for display. A backlight module with high performance is necessary for a liquid crystal display with a large size and a high definition. When the liquid crystal display industry is striving to expand new applications, a backlight module technology with a high performance plays an important role.

In the backlight module formed by current technologies, a light source mainly deals with a visible light, which limits display modes of the display device.

The present disclosure provides a backlight module and a display device. Two light guide plates (including a first light guide plate and a second light guide plate) and two light sources with two wavelengths corresponding to the two light guide plates respectively may be disposed in the backlight module. A first reflector may be disposed between the first light guide plate and the second light guide plate. Correspondingly, lights with different wavelengths may display at different times or display simultaneously. A display performance of the lights with different wavelengths may also be improved.

As illustrated in FIG. 1 showing a cross-section view of an exemplary backlight module, in one embodiment, a backlight module 100 may be provided. The backlight module 100 may include an accommodation frame 10, a first light guide plate 31, a second light guide plate 32, a first light source 51 corresponding to the first light guide plate 31, a second light source 52 corresponding to the second light guide plate 32.

The accommodation frame 10 may include a base 11 and an extension part 12 around the base 11. The base 11 and the extension part 12 may form an accommodation space 20.

The first light guide plate 31 and the second light guide plate 32 may be disposed sequentially along a direction perpendicular to the plane of the base 11. A first reflector 41 may be further disposed between the first light guide plate 31 and the second light guide plate 32. The first reflector 41, the first light guide plate 31 and the second light guide plate 32 may be all disposed in the accommodation space 20.

The first light source 51 and the second light source 52 may be controlled independently. The first light source 51 may have a wavelength λ1 with 780 nm<λ1≤1310 nm. The second light source 52 may have a wavelength λ2 of 380 nm≤λ2≤780 nm. The first reflector 41 may have a refection rate for light beams from the second light source 52 higher than a refection rate for the light beams from the first light source 51.

In the embodiment, the first light guide plate 31, the first reflector 41, and the second light guide plate 32 may be sequentially disposed in the accommodation space 20 formed by the base 11 and the extension part 12. The first light guide plate may be disposed at a side of the second light guide plate 52 close to the base 11. The display device may further include the first light source 51 corresponding to the first light guide plate 31 and the second light source 52 corresponding to the second light guide plate 32. The wavelength λ1 of the first light source 51 may be 780 nm<λ1≤1310 nm, for providing infrared lights. And the wavelength λ2 of the second light source 52 may be 380 nm≤λ2≤780 nm, for providing visible lights. Light with different wavelengths (that is infrared light and visible light) may be used to display at different times and/or simultaneously. The second light source may be configured to emitting the visible light for normal display. The first light source may be configured to emitting the infrared light for special display and some other devices may be used to retrieving contents of the infrared display, for conceal the display contents. The first reflector 41 between the first light source 51 and the second light source 52 may have a refection rate for the visible light from the second light source 52 higher than a refection rate for the infrared light from the first light source 51. For the infrared light, the first reflector 41 may have a higher transmission rate and a lower reflectivity. When performing the infrared display, more infrared light may transmit through the first reflectivity. Brightness and contrast of infrared displaying images may be enhanced, and an infrared display performance may be improved. When performing the visible light display, more visible light may be reflected to a light exiting surface of the backlight module because of the reflection on the first reflector 41. A utilization efficiency of the visible light may be increased. Brightness and a contrast of visible displaying images may be enhanced, and a visible display performance may be improved.

In some embodiments, the wavelength λ1 of the first light source 51 may be 780 nm<λ1≤1310 nm. The infrared light may have a large wavelength band. When performing the infrared display, more infrared light may transmit through the first reflectivity. Brightness and a contrast of infrared displaying images may be enhanced, and an infrared display performance may be improved.

Figure 2:
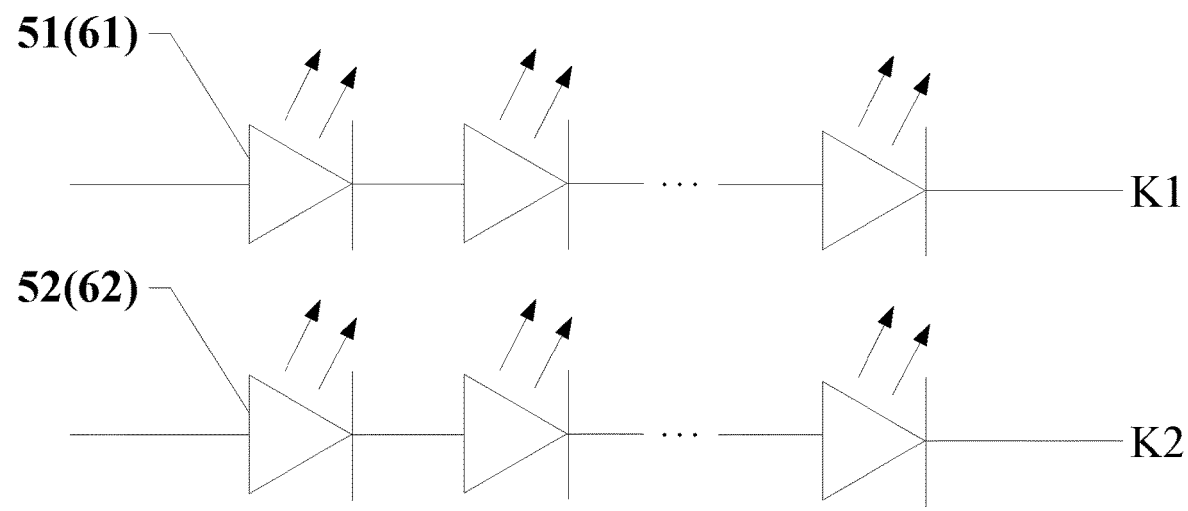
FIG. 2 illustrates a loop diagram of an exemplary backlight module consistent with various disclosed embodiments in the present disclosure.

FIG. 2 illustrates a loop diagram of the first light source 51 and the second light source in an exemplary backlight module 100. In one embodiment, the first light source 51 may include a plurality of first light-emitting diodes (LEDs) 61. Each of the plurality of first LEDs 61 may be an infrared LED for emitting the infrared light. The second light source 52 may include a plurality of second LEDs 62. Each of the plurality of second LEDs 62 may be a white LED for emitting the visible light. The plurality of first LEDs 61 and the plurality of second LEDs 62 may be disposed in different loops and may be controlled by two different switches K1 and K2 respectively. When the white LEDs are needed, the switch K1 for the plurality of second LEDs may be turned on; when the infrared LEDs are needed, the switch K2 for the plurality of first LEDs 61 may be turned on. If both the white LEDs and the infrared LEDs are needed, the switches K1 and K2 for the plurality of first LEDs 61 and the plurality of second LEDs 62 may be turned on simultaneously. Correspondingly, in the backlight module, the infrared light and the visible light with different wavelengths may display at different times or display simultaneously.

The embodiment where the first light guide plate 31, the first reflector 41, the second light guide plate 32, the first light source 51, and the second light source 52 have a size and a position relationship between them shown in FIG. 1 is used as an example to illustrate the present disclosure for description purposes only, and should not limit scopes of the present disclosure. In various embodiments, the first light guide plate 31, the first reflector 41, the second light guide plate 32, the first light source 51, and the second light source 52 have any suitable size and any suitable position relationship between them.

In one embodiment, in the backlight module 100, the first reflector 41 may have a refection rate A for the light from the first light source 51 smaller than or equal to about 30%. That is the first reflector 41 may have a refection rate A for the infrared light smaller than or equal to about 30% since the first light source 51 may emit the infrared light. When the infrared light from the first light source 51 propagates to the first reflector 41 through the first light guide plate 31, only a small amount of the infrared light may be reflected and a large amount of the infrared light may propagate to the light exiting surface of the backlight module 100 through the first reflector 41. When performing the infrared display, more infrared light may transmit through the first reflectivity. Brightness and a contrast of infrared displaying images may be enhanced, and an infrared display performance may be improved. In some other embodiments, the first reflector 41 may have another refection rate A for the infrared light, for example, A≤10%, to further improve the utilization efficiency of the infrared light.

In one embodiment, in the backlight module 100, the first reflector 41 may have a refection rate B for the light from the second light source 52 and B may be larger than or equal to about 70%. That is the first reflector 41 may have a refection rate B for the visible light larger than or equal to about 70% since the second light source 52 may emit the visible light.

When the visible light from the second light source 52 propagates to the first reflector 41, a portion of the visible light from the second light source 52 may enter the second light guide plate 32 directly while a remaining portion of the visible light from the second light source 52 may enter the second light guide plate 32 after being reflected by the first reflector 41. Correspondingly, a large amount of the visible light may enter the second light guide plate 32 because of the first reflector 41 and an amount of the visible light propagating to the light exiting surface of the backlight module 100 may be increased. A utilization efficiency of the visible light may be increased. Brightness and contrast of visible displaying images may be enhanced, and a visible display performance may be improved.

In one embodiment, the first reflector 41 in the backlight module 100 may have a thickness D1 of about 50 μm to about 200 μm. If D1 is larger than or equal to 50 μm, the first reflector 41 may transmit the infrared light and reflect the visible light effectively. The first reflector 41 may not have a too small thickness, so a crack of the first reflector 41 when forming/utilizing the backlight module 100 may be avoided. If D1 is smaller than or equal to 200 μm, the first reflector 41 may transmit the infrared light and reflect the visible light effectively. The first reflector 41 may also not have a too large thickness, and a thickness of the backlight module 100 may be reduced. A thin backlight module and a thin display device may be achieved. For example, in one embodiment, the thickness D1 of the first reflector 41 in the backlight module 100 may be about 100 μm.

In one embodiment, the first reflector 41 in the backlight module 100 may be made of a multilayer film polyester film composite structure including a polyethylene terephthalate multilayer composite structure and the multilayer composite structure may be an enhanced specular reflector structure. The first reflector 41 formed by a multilayer film polyester film composite structure may have a large reflectivity in the visible wavelength band and then have a small loss when reflecting the visible light. The visible light from the second light source 52 may be utilized in high efficiency. The brightness and contrast of visible displaying images may be enhanced, and a visible display performance may be improved. Also, the first reflector 41 formed by a multilayer film polyester film composite structure may have a small reflectivity for the infrared light. A large portion of the infrared light propagating to the first reflector 41 through the first light guide plate 31 may transmit through the first reflector 41 to the light exiting surface of the backlight module. A utilization efficiency of the infrared light may be improved. The brightness and contrast of visible displaying images may be enhanced.

In one embodiment, the first light source 51 in the backlight module 100 may be disposed on a side of the base 11 facing toward the first light guide plate 31. The first light source 51 may include a plurality of first LEDs 61 arranged in an array. The second light source 52 in the backlight module 100 may be disposed on a side of the extending part 12 facing toward the second light guide plate 32, and may include a plurality of second LEDs 62.

In the embodiment, the first light source 51 may be disposed at a bottom of the backlight module and the second light source 52 may be disposed at a side of the backlight module 100. The infrared light from the first light source 51 may propagate to the first light guide plate 31 from the bottom of the backlight module 100, and may arrive at the light exiting surface of the backlight module 100 through the film layers including the first reflector 41 and the second light guide plate 32. The visible light from the second light source 52 may propagate to the second light guide plate 32 from the side of the second light guide plate 32, and may arrive at the light exiting surface of the backlight module 100 through the film layers including the second light guide plate 32. The backlight module 100 may behave as a direct lighting backlight module when performing the infrared display only and may behave as an edge lighting backlight module when performing the visible display only. When performing the infrared display and the visible display simultaneously, the backlight module 100 may behave as a combination of the direct lighting backlight module and the edge lighting backlight module. Correspondingly, the infrared display and the visible display may be achieved at different times or simultaneously. An application field of the display device and the backlight module may be expanded.

In one embodiment illustrated in FIG. 1, the first light guide plate 31 may be a diffuser plate. A thickness of the first light guide plate 31 along a direction perpendicular to the plane of the base 11 may be smaller than a thickness of the second light guide plate 32 along a direction perpendicular to the plane of the base 11. The first light guide plate 31 may be made of a diffuser plate when the first light source 51 is disposed on the base 11 of the backlight module 100. Correspondingly, when the infrared light from the first light source 51 propagates to the diffuser plate, the diffuser plate may dissipate the infrared light to make the light emitted from the diffuser plate more uniform. A phenomenon that a part of the region has a higher brightness and another part of the region has a lower brightness may be avoided. A uniform planar light may be provided by the backlight module and display performance of the display device may be improved. The first light source 51 may be a direct lighting source and the light from the first light source 51 may enter the first light guide plate 31 from a side of the first light guide plate 31 facing toward the base 11. The first light guide plate 31 may have a small thickness D2, for example, smaller than the thickness of the second light guide plate 32. A thickness of the backlight module 100 may be reduced to meet a thin display device.

Figure 3:
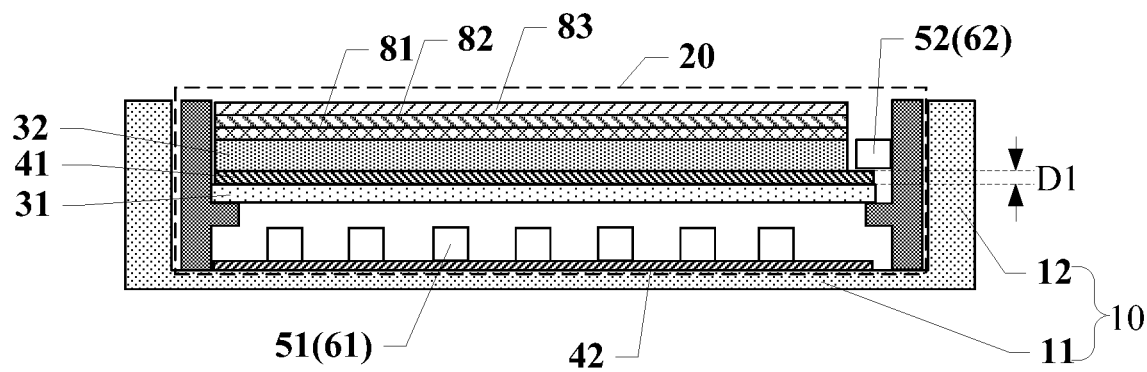
FIG. 3 illustrates a cross-section view of another exemplary backlight module consistent with various disclosed embodiments in the present disclosure.

FIG. 3 illustrates a cross-section view of another exemplary backlight module 100 in one embodiment. The backlight module 100 may further include a second reflector 42 on the base 11. The second reflector 42 may be disposed between the plurality of first LEDs 61 and the base 11.

The second reflector 42 may be disposed between the plurality of first LEDs 61 in the first light source 51 and the base 11. A portion of the infrared light from the first light source 51 may propagate to the first light guide plate 31 directly. Another portion of the infrared light from the first light source 51 may propagate to the second reflector 42 and then enter the first light guide plate 31 after being reflected by the second reflector 42. The second reflector 42 may increase a utilization rate of the infrared light from the first light source 51, and an amount of the infrared light emitted from the light exiting surface of the backlight module 100. The brightness and contrast of the infrared display may be enhanced.

Figure 4:
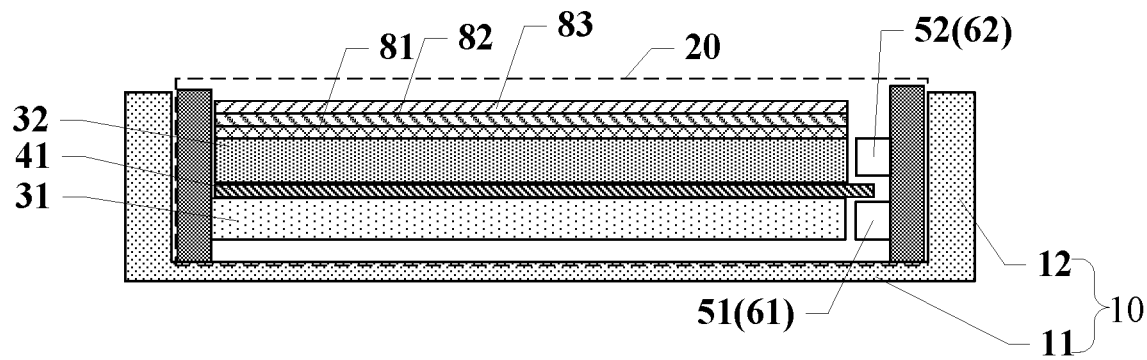
FIG. 4 illustrates a cross-section view of another exemplary backlight module consistent with various disclosed embodiments in the present disclosure.

FIG. 4 illustrates a cross-section view of another exemplary backlight module in one embodiment. In one embodiment, the first light source 51 may be disposed at a side of the extending part 12 facing toward the first light guide plate 31. The first light source 51 may include a plurality of first LEDs 61. The second light source 52 may be disposed at a side of the extending part 12 facing toward the second light guide plate 32. The second light source 52 may include a plurality of second LEDs 61.

In this embodiment, the first light source 51 and the second light source 52 may both be disposed on sidewalls of the accommodating space 20 formed by the accommodation frame 10. The first light source 51 may be disposed facing toward the first light guide plate 31. The light emitted by the plurality of first LEDs 61 of the first light source 51 may enter the first light guide plate 31. The second light source 52 may be disposed facing toward the second light guide plate 32. The light emitted by the plurality of second LEDs 62 of the second light source 52 may enter the second light guide plate 32. The first light source 51 and the second light source 52 may both be disposed on sidewalls of the accommodating space 20 and the backlight module 100 may behave as an edge lighting backlight module. The infrared display and the visible display may be achieved at different times or simultaneously by controlling the first light source 51 and the second light source 52. An application field of the display device and the backlight module may be expanded.

Figure 5:
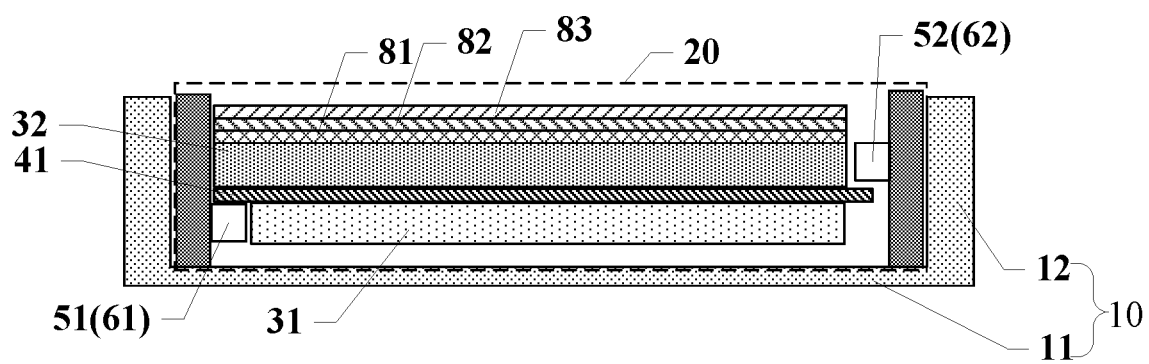
FIG. 5 illustrates a cross-section view of another exemplary backlight module consistent with various disclosed embodiments in the present disclosure.

The embodiment where the first light source 51 and the second light source 52 may both be disposed at one same side of the first light guide plate 31 and the second light guide plate 32 shown in FIG. 4 is used as an example to illustrate the present disclosure for description purposes only and should not limit the scopes of the present disclosure. In various embodiments, the first light source 51 and the second light source 52 may both be disposed at one same side or at different sides of the first light guide plate 31 and the second light guide plate 32. In one embodiment illustrated in FIG. 5, the first light source 51 and the second light source 52 may both be disposed at different sides of the first light guide plate 31 and the second light guide plate 32.

Figure 6:
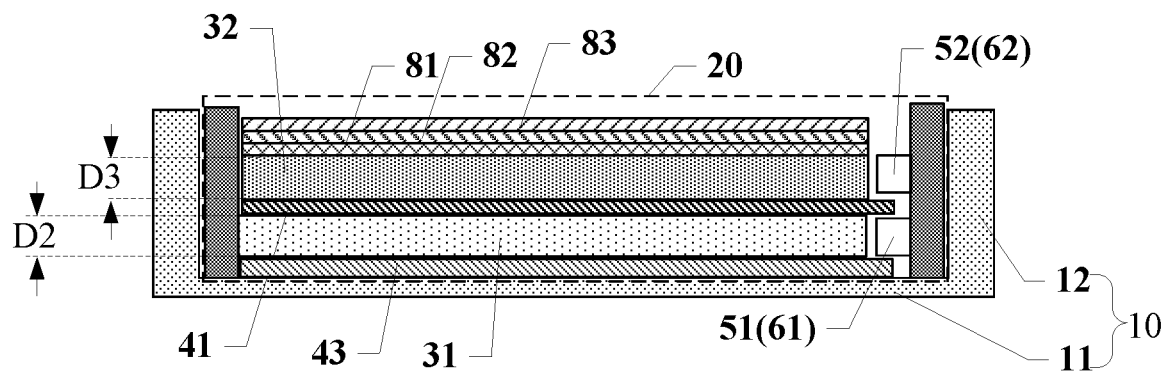
FIG. 6 illustrates a cross-section view of another exemplary backlight module consistent with various disclosed embodiments in the present disclosure.

FIG. 6 illustrates a cross-section view of another exemplary backlight module 100 in one embodiment. The backlight module 100 may further include a third reflector 43 on the base 11. The third reflector 43 may be disposed between the first guiding panel 31 and the base 11.

In the embodiment illustrated in FIG. 6, the backlight module 100 may use an edge lighting source structure, and the third reflector 43 may be disposed between the first guiding panel 31 and the base 11. A portion of the infrared light from the first light source 51 may propagate to the first light guide plate 31 directly. Another portion of the infrared light from the first light source 51 may propagate to the third reflector 43 and then enter the first light guide plate 31 after being reflected by the third reflector 43. The third reflector 43 may increase a utilization rate of the infrared light from the first light source 51, and an amount of the infrared light emitted from the light exiting surface of the backlight module 100. The brightness and contrast of the infrared display may be enhanced.

In the embodiment illustrated in FIG. 6, the thickness D2 of the first light guide plate 31 along a direction perpendicular to the plane of the base 11 may equal to the thickness D3 of the second light guide plate 32 along a direction perpendicular to the plane of the base 11.

When the first light source 51 and the second light source 52 may both be disposed at one same side of the accommodating space 20 formed by the accommodation frame 10, the first light source 51 and the second light source 52 may both belong to the edge lighting source. The infrared light from the first light source 51 and the visible light from the second light source 52 may enter the first light guide plate 31 and the second light guide plate 32 respectively. Then the first light guide plate 31 and the second light guide plate 32 may convert the linear light sources from the first light source 51 and the second light source 52 to the planar light sources respectively. In this structure, the first light guide plate 31 and the second light guide plate 32 may have same roles, and may be used to convert the linear light sources to the planar light sources. Correspondingly, the first light guide plate 31 and the second light guide plate 32 may have a same structure. When the thickness D2 of the first light guide plate 31 along a direction perpendicular to the plane of the base 11 equals to the thickness D3 of the second light guide plate 32 along a direction perpendicular to the plane of the base 11, the first light guide plate 31 and the second light guide plate 32 may be formed with a same size. A process for forming the first light guide plate 31 and the second light guide plate 32 in the backlight module 100 may be simplified, and a production rate of the backlight module 100 may be improved.

In one embodiment illustrated in FIGS. 3-6, the backlight module 100 may further include a diffuser plate 81, a lower prism plate 82, and an upper prism plate 83, disposed on a side of the second light guide plate 32 away from the base 11 sequentially. Since the diffuser plate 81 is disposed at a light emitting direction of the backlight module 100 (on a side of the second light guide plate 32 away from the base 11), the light from the first light guide plate 31 and from the second light guide plate 32 may be dissipated to provide a uniform planar light source for the display device. When the light from the first light source 51 and the second light source 52 passes through the lower prism plate 82 and the upper prism plate 83, only a portion of the light with an incident angle in a certain range can be emitted by refraction. A remaining portion of the light may return to light sources after being reflected by the edges of the prims since it does not meet a refraction condition, and then may be emitted again by the reflector at the bottom of the light sources. The light of the backlight module 100 may be continuously recycled by the lower prism plate 82 and the upper prism plate 83. The light originally diverging in various directions may be concentrated in a visible angle range (for example, a visible angle range of 70°) after passing through the lower prism plate 82 and the upper prism plate 83. An axial brightness enhancement may be achieved and the brightness in the visible range of the display device may be increased.

Figure 7:
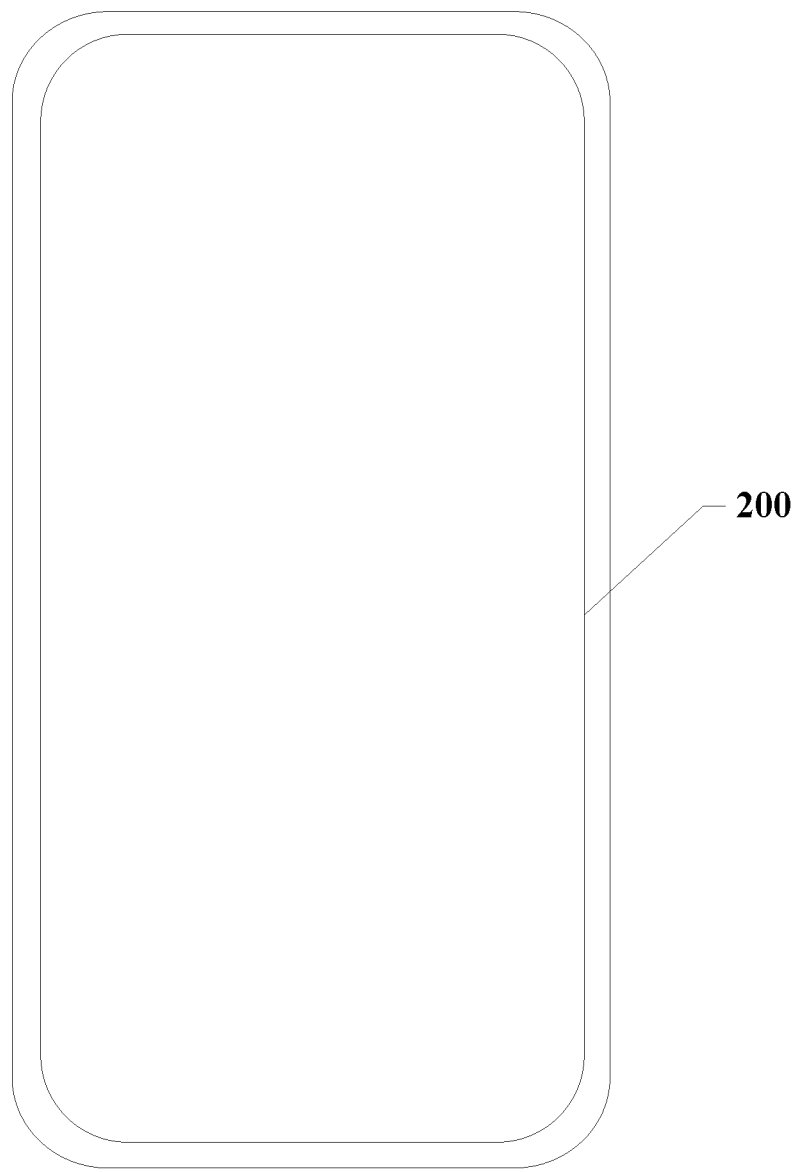
FIG. 7 illustrates a top view of an exemplary display device consistent with various disclosed embodiments in the present disclosure.
Figure 8:
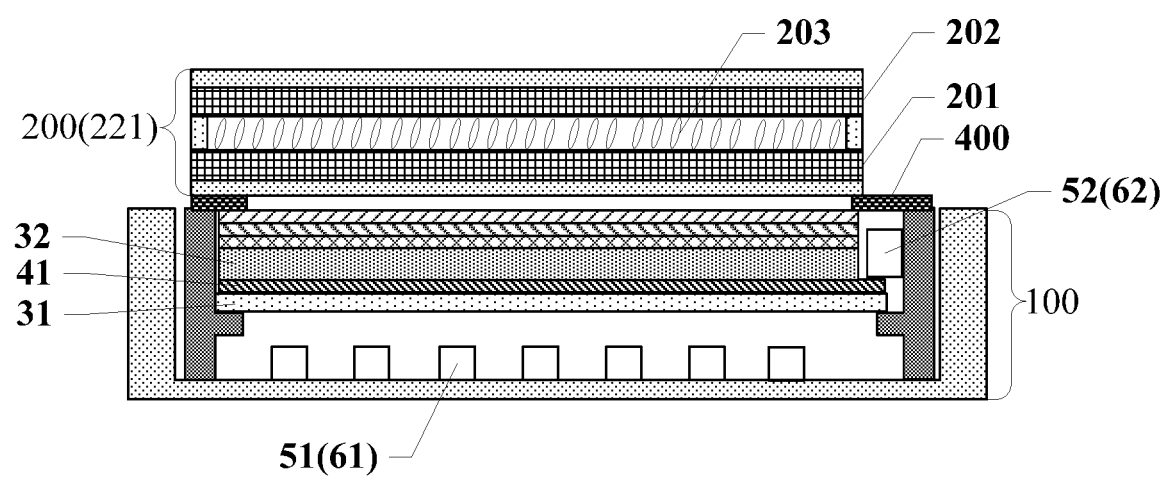
FIG. 8 illustrates a cross-section view of an exemplary display device consistent with various disclosed embodiments in the present disclosure.

The present disclosure also provides a display device. As illustrated in FIGS. 7-8, the display device 300 may include a display panel 200 and a backlight module 100. The backlight module 100 may be any one of the display modules provided by various embodiments of the present disclosure. The display panel 200 may have a structure illustrated in FIG. 9.

Figure 9:
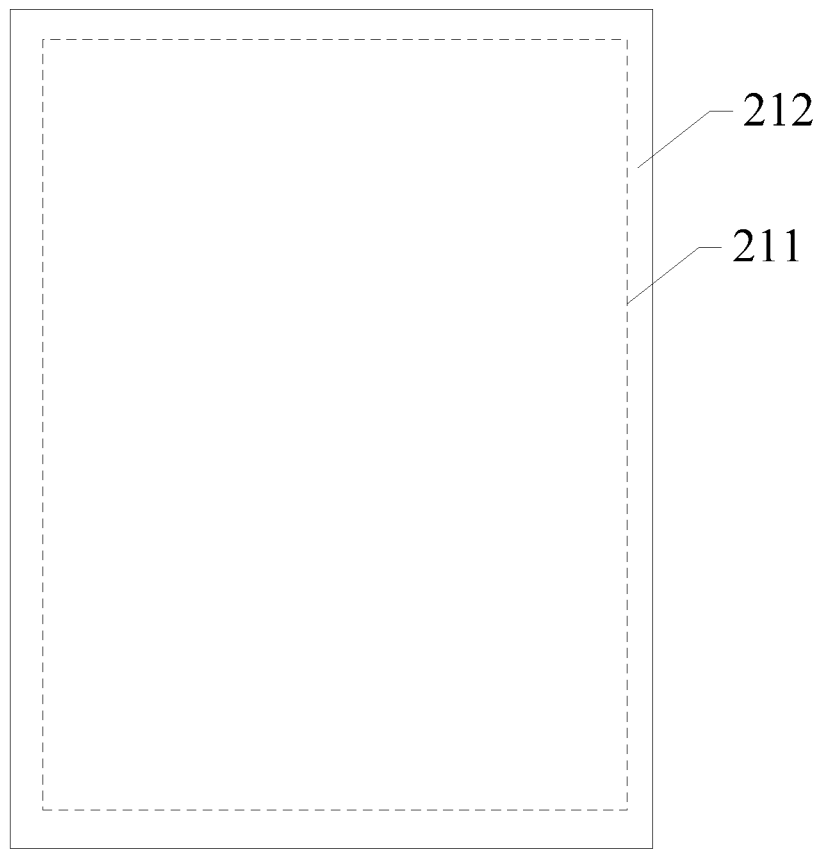
FIG. 9 illustrates a top view of a display panel in an exemplary display device consistent with various disclosed embodiments in the present disclosure.
Figure 10:
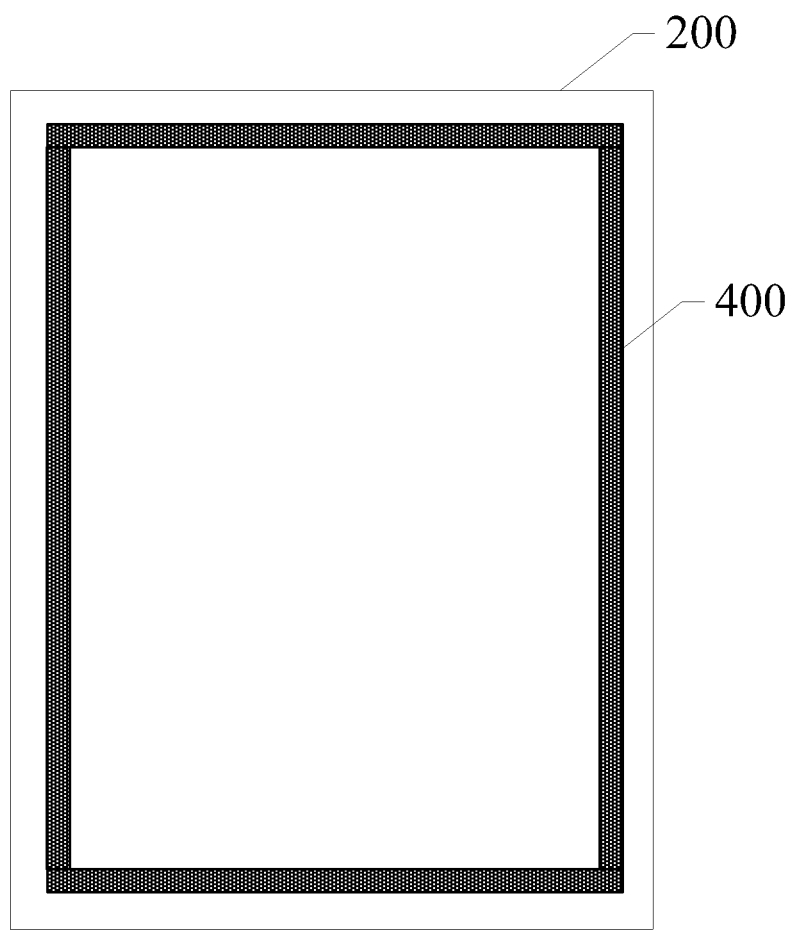
FIG. 10 illustrates a structure of a display panel and a light-blocking glue stripe in an exemplary display device consistent with various disclosed embodiments in the present disclosure.

As illustrated in FIGS. 8-9, a side of the display panel 200 away from the light exiting surface of the backlight module 100 and the backlight module 100 may be fixed to each other by a light blocking glue 400. The display panel 200 may include a display area 211 and a non-display area 212 surrounding the display area 211. The light blocking glue 400 may be disposed in the non-display area 212. FIG. 10 illustrates a structure of a display panel 200 and a light-blocking glue 400 in an exemplary display device consistent with various disclosed embodiments in the present disclosure.

As illustrated in FIGS. 7-10, in one embodiment, the light blocking glue 400 may be used to attach the backlight module 100 with a bottom of the display panel 200, to dispose the backlight module 100 in the display device 300. The first light source 51 and/or the second light source 52 in the backlight module 100 may provide light sources to the display panel 200 for normal display. Since the display panel 200 and the backlight module 100 is attached to each other by a circle of the light blocking glue 400, the light blocking glue 400 may effectively block a leak of the light emitted by the backlight module 100 from ad adjunction area between the display panel 200 and the backlight module 100. A light utilization efficiency of the backlight module 100 may be improved.

In one embodiment illustrated in FIG. 8, the display panel 200 in the display device 300 may include a first display panel 221. The first display panel 221 may include a first array substrate 201 and a first color film substrate 202 opposite to each other. A liquid crystal layer 203 may further be disposed between the first array substrate 201 and the first color film substrate 202. The backlight module 100 may include the first light source 51 and the second light source 52. The first light source 51 may have a wavelength $\lambda 1$ with 780 nm$<\lambda 1 \leq 1310$ nm. The second light source 52 may have a wavelength $\lambda 2$ of 380 nm$\leq \lambda 2 \leq 780$ nm.

The light emitted by the first light source 51 and/or the second light source 52 may provide light sources to the first display panel 221 for normal display.

In one embodiment illustrated in FIG. 8, the first light source 51 and the second light source 52 may be disposed in the display device 300, and may be controlled independently. The first light source 51 may have a wavelength $\lambda 1$ with 780 nm$<\lambda 1 \leq 1310$ nm for the infrared light in the higher wavelength band. The second light source 52 may have a wavelength $\lambda 2$ of 380 nm$\leq \lambda 2 \leq 780$ nm for the visible light. The first light source 51 and the second light source 52 may be controlled independently. Light with different wavelengths (that is infrared light and visible light) may be used to display at different times and/or simultaneously. The second light source may be configured to emitting the visible light for normal display. The first light source may be configured to emitting the infrared light for special display and some other devices may be used to retrieving contents of the infrared display, for conceal the display contents. The second light source and the first light source may be configured to emitting the light simultaneously. Correspondingly, the infrared light and the visible light may be used to display at different times and/or simultaneously.

Figure 11:
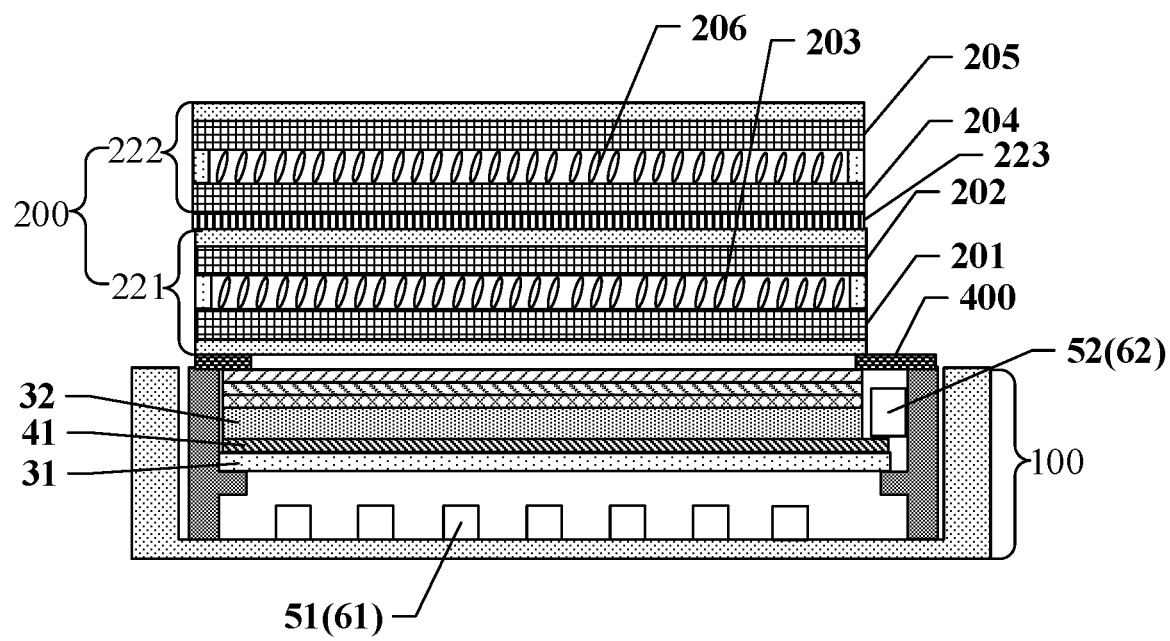
FIG. 11 illustrates a top view of another exemplary display device consistent with various disclosed embodiments in the present disclosure.

In some other embodiment illustrated in FIG. 11, the display panel 200 of the display device 300 may include a first display panel 221 and a second display panel 222 in a multilayer stacking structure. The first display panel 221 may be disposed at a side of the second display panel 222 close to the backlight module and may be attached to the backlight module 100.

The first display panel 221 may include a first array substrate 201 and a first color film substrate 202 opposite to each other. A first liquid crystal layer 203 may further be disposed between the first array substrate 201 and the first color film substrate 202. The second display panel 222 may include a second array substrate 204 and a second color film substrate 205 opposite to each other. A second liquid crystal layer 206 may further be disposed between the second array substrate 204 and the second color film substrate 205.

The backlight module 100 may include the first light source 51 and the second light source 52. The first light source 51 may have a wavelength $\lambda 1$ with 780 nm$<\lambda 1 \leq 1310$ nm. The second light source 52 may have a wavelength $\lambda 2$ of 380 nm$\leq \lambda 2 \leq 780$ nm.

In one embodiment, the light emitted by the first light source 51 may provide light sources to the first display panel 221 for display, and the light emitted by the second light source 52 may provide light sources to the second display panel 222 for display. In some other embodiments, the light emitted by the first light source 51 may provide light sources to the second display panel 222 for display, and the light emitted by the second light source 52 may provide light sources to the first display panel 221 for display.

In the embodiment shown in FIG. 11, the display device 300 may include the first display panel 221 and the second display panel 222. The first display panel 221 may include the first array substrate 201 and the first color film substrate 202 opposite to each other. The first liquid crystal layer 203 may further be disposed between the first array substrate 201 and the first color film substrate 202. The second display panel 222 may include the second array substrate 204 and the second color film substrate 205 opposite to each other. The second liquid crystal layer 206 may further be disposed between the second array substrate 204 and the second color film substrate 205. The light emitted by the first light source 51 may provide light sources to the first display panel 221 for display, and the light emitted by the second light source 52 may provide light sources to the second display panel 222 for display. Or, the light emitted by the first light source 51 may provide light sources to the second display panel 222 for display, and the light emitted by the second light source 52 may provide light sources to the first display panel 221 for display. In the visible light state, the second light source 52 in the black light module 100 may provide the visible light and the second display panel 222 may display. In the infrared light state, the first light source 51 in the backlight module 100 may provide the infrared light and the first display panel 221 may display. In a state where the infrared light and the visible light display simultaneously, the first light source 51 and the second light source 52 in the black light module 100 may emit the light simultaneously, and the first display panel 221 and the second display panel 222 may perform the infrared light display and the visible light display simultaneously. In this embodiment, the infrared light display and the visible light display may be achieved in the different display panels, and the display device may be formed easily.

In one embodiment of the present disclosure, the display device 300 may use the first display panel 221 and the second display panel 222 to display at different times or simultaneously. The infrared light display and the visible light display may be achieved at different times or simultaneously.

In the embodiment, the first light guide plate 31, the first reflector 41, and the second light guide plate 32 may be sequentially disposed in the accommodation space 20 formed by the base 11 and the extension part 12. The first light guide plate may be disposed at a side of the second light guide plate 52 close to the base 11. The display device may further include the first light source 51 corresponding to the first light guide plate 31 and the second light source 52 corresponding to the second light guide plate 32. The first light source 51 may have a wavelength $\lambda 1$ with 780 nm$<\lambda 1 \leq$1310 nm for the infrared light in the higher wavelength band. The second light source 52 may have a wavelength $\lambda 2$ of 380 nm$\leq \lambda 2 \leq$780 nm for the visible light. Light with different wavelengths (that is infrared light and visible light) may be used to display at different times and/or simultaneously. The second light source may be configured to emitting the visible light for normal display. The first light source may be configured to emitting the infrared light for special display and some other devices may be used to retrieving contents of the infrared display, for conceal the display contents. The first reflector 41 between the first light source 51 and the second light source 52 may have a refection rate for the visible light from the second light source 52 higher than a refection rate for the infrared light from the first light source 51. For the infrared light, the first reflector 41 may have a higher transmission rate and a lower reflectivity. When performing the infrared display, more infrared light may transmit through the first reflectivity. The brightness and contrast of infrared displaying images may be enhanced, and an infrared display performance may be improved. When performing the visible light display, more visible light may be reflected to a light exiting surface of the backlight module because of the reflection on the first reflector 41. A utilization efficiency of the visible light may be increased. The brightness and contrast of visible displaying images may be enhanced, and a visible display performance may be improved.

In one embodiment, a side of the first display panel 221 may be attached to a side of the second display panel 222 away from the light emitting surface by a pressure-sensitive glue 223. A reliable attachment between the first display panel 221 and the second display panel 222 may be achieved. The pressure-sensitive glue 223 between the first display panel 221 and the second display panel 222 may be made of a transparent structure. Correspondingly, when the first display panel 221 displays, the images displayed by the first display panel 221 may transmit through the second display panel 222 for users' view. A normal display in the first display panel 221 in the display device may not be interfered.

In the backlight module and display device provided by various embodiments of the present disclosure, the first light guide plate, the second light guide plate, the first light source corresponding to the first light guide plate, and the second light source corresponding to the second light guide plate may be formed. The first light source may have a wavelength $\lambda 1$ with 780 nm$<\lambda 1 \leq$1310 nm for the infrared light in the higher wavelength band. The second light source may have a wavelength $\lambda 2$ of 380 nm$\leq \lambda 2 \leq$780 nm for the visible light. Since the first light source and the second light source may be controlled independently, light with different wavelengths (that is infrared light and visible light) may be used to display at different times and/or simultaneously. The backlight module may be configured to emitting the visible light for normal display, and may be configured to emitting the infrared light for special display and some other devices may be used to retrieving contents of the infrared display for concealing the display contents. The first reflector between the first light source and the second light source may have a refection rate for the visible light from the second light source higher than a refection rate for the infrared light from the first light source. For the infrared light, the first reflector may have a higher transmission rate and a lower reflectivity. When performing the infrared display, more infrared light may transmit through the first reflectivity. The brightness and contrast of infrared displaying images may be enhanced, and an infrared display performance may be improved. When performing the visible light display, more visible light may be reflected to a light exiting surface of the backlight module because of the reflection on the first reflector 41. A utilization efficiency of the visible light may be increased. The brightness and contrast of visible displaying images may be enhanced, and a visible display performance may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure.

Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A backlight module, comprising:
an accommodation frame including a base and an extending part surrounding the base;
a first light guide plate;
a second light guide plate;
a first reflector;
a first light source corresponding to the first light guide plate; and
a second light source corresponding to the second light guide plate;
wherein:
the base and the extending part together form an accommodation space;
the first light guide plate and the second light guide plate are disposed sequentially along a direction perpendicular to a plane of the base;
the first reflector is disposed between the first light guide plate and the second light guide plate;
the first light guide plate, the first reflector, and the second light guide plate are disposed in the accommodation space;
the first reflector has a portion extended to overlap with the second light source in the direction perpendicular to the plane of the base, to receive a portion of light from the second light source and to reflect the received light into the second light guide plate;
the first light source and the second light source are controlled independently;
the first light source has a wavelength ($\lambda 1$), wherein 780 nm<$\lambda 1$≤1310 nm;
the second light source has a wavelength ($\lambda 2$) 380 nm≤$\lambda 2$≤780 nm; and
a reflectivity of the first reflector on light emitted by the second light source is larger than a reflectivity of the first reflector on light emitted by the first light source.

2. The backlight module according to claim 1, wherein:
the reflectivity of the first reflector on the light emitted by the first light source is smaller than or equal to about 30%.

3. The backlight module according to claim 1, wherein:
the reflectivity of the first reflector on the light emitted by the second light source is larger than or equal to about 70%.

4. The backlight module according to claim 1, wherein a thickness D1 of the first reflector is 50 µm≤D1≤20 µm.

5. The backlight module according to claim 1, wherein the first reflector has a multilayer polyester film composite structure.

6. The backlight module according to claim 1, wherein:
the first light source is disposed at a side of the base facing toward the first light guide plate;
the first light source includes a plurality of first light emitting diodes arranged in an array;
the second light source is disposed at a side of the extending part facing toward the second light guide plate; and
the second light source includes a plurality of second light emitting diodes.

7. The backlight module according to claim 6, wherein:
the first light guide plate is a diffuser plate; and
along the direction perpendicular to the plane of the base, a thickness of the first light guide plate is smaller than a thickness of the second light guide plate.

8. The backlight module according to claim 7, further including a second reflector on the base, wherein:
the second reflector is disposed between the plurality of first light emitting diodes and the base.

9. The backlight module according to claim 1, wherein:
the first light source is disposed at a side of the extending part facing toward the first light guide plate and includes a plurality of first light emitting diodes; and
the second light source is disposed at a side of the extending part facing toward the second light guide plate, and includes a plurality of second light emitting diodes.

10. The backlight module according to claim 9, wherein the first light source and the second light source are disposed at a same side of a combined structure of the first light guide plate and the second light guide plate.

11. The backlight module according to claim 9, wherein the first light source and the second light source are disposed at different sides of a combined structure of the first light guide plate and the second light guide plate.

12. The backlight module according to claim 9, further including a third reflector on the base, wherein the third reflector is disposed between the first light guide plate and the base.

13. The display module according to claim 9, wherein:
along the direction perpendicular to the plane of the base, a thickness of the first light guide plate is equal to a thickness of the second light guide plate.

14. The display module according to claim 9, further including a diffuser plate, a lower prism plate, and an upper prism plate, disposed sequentially at a side of the second light guide plate away from the base.

15. A display device, comprising:
a display panel and a backlight module, the backlight module including:
an accommodation frame including a base and an extending part surrounding the base; a first light guide plate; a second light guide plate; a first reflector; a first light source corresponding to the first light guide plate; and a second light source corresponding to the second light guide plate, wherein:
the first light guide plate and the second light guide plate are disposed sequentially along a direction perpendicular to a plane of the base, and the first reflector is disposed between the first light guide plate and the second light guide plate,
the first reflector has a portion extended to overlap with the second light source in the direction perpendicular to the plane of the base, to receive a portion of light from the second light source and to reflect the received light into the second light guide plate,
the first light source has a wavelength ($\lambda 1$), wherein 780 nm<$\lambda 1$≤1310 nm,
the second light source has a wavelength ($\lambda 2$) 380 nm≤$\lambda 2$≤780 nm, and
a reflectivity of the first reflector on light emitted by the second light source is larger than a reflectivity of the first reflector on light emitted by the first light source;
wherein:
a side of the display panel away from a light exiting surface is attached to the backlight module by a light blocking tape;

the display panel includes a display area and a non-display area surrounding the display area; and
the light blocking tape is disposed in the non-display area.
16. The display device according to claim 15, wherein:
the display panel includes a first display panel;
the first display panel includes a first array substrate, a first color film substrate configured opposite to the first array substrate, and a liquid crystal layer between the first color film substrate and the first array substrate; and
light emitted by the first light source and/or the second light source of the backlight module provides light sources to the first display panel.
17. The display device according to claim 15, wherein:
the display panel includes a first display panel and a second display panel stacked on the first display panel;
the first display panel is disposed on a side of the second display panel adjacent to the backlight module and is attached to the backlight module;
the first display panel includes a first array substrate, a first color film substrate configured opposite to the first array substrate, and a first liquid crystal layer between the first color film substrate and the first array substrate;
the second display panel includes a second array substrate, a second color film substrate configured opposite to the second array substrate, and a second liquid crystal layer between the second color film substrate and the second array substrate; and
light emitted by the first light source provides a light source to one of the first and second display panels, and light emitted by the second light source provides a light source to another of the first and second display panels.
18. The display device according to claim 17, wherein the first display panel and the second display panel display at a same time or perform a time-sharing display.
19. The display device according to claim 18, wherein:
a side of the first display panel adjacent to the light exiting surface is attached to a side of the second display panel away from the light exiting surface by a pressure-sensitive glue.

* * * * *